United States Patent [19]

Cimenti

[11] Patent Number: 4,941,403
[45] Date of Patent: Jul. 17, 1990

[54] JUICE EXTRACTOR MACHINES FOR FRUIT AND VEGETABLES

[76] Inventor: Antonio Cimenti, Via Baron 15, S. Dona' di Piave (VE), Italy, 30027

[21] Appl. No.: 214,434

[22] Filed: Jul. 1, 1988

[51] Int. Cl.$^5$ ............................................. A23N 1/00
[52] U.S. Cl. ...................................... 99/492; D7/665; 99/510; 100/53; 215/285; 215/286; 220/318; 241/37.5; 366/601
[58] Field of Search .......... 99/492, 495, 509, 510–513; 100/53; D7/48, 49; 220/318; 215/280, 284, 285, 286; 366/601; 241/37.5

[56] References Cited

U.S. PATENT DOCUMENTS

| D. 118,470 | 1/1940 | Drachenberg | D7/49 |
| D. 183,542 | 9/1958 | Posener et al. | D7/49 |
| D. 226,345 | 2/1973 | Greubel | D7/49 |
| 1,940,538 | 12/1933 | French | 215/285 |
| 1,941,337 | 12/1933 | Cato et al. | 215/286 |
| 2,656,866 | 10/1953 | Rumsey | 99/578 |
| 4,297,038 | 10/1981 | Falkenbach | 366/601 |
| 4,491,251 | 1/1985 | Pratz et al. | 220/318 |
| 4,706,559 | 11/1987 | De Zarate | D7/49 |
| 4,716,823 | 1/1988 | Capdevila | 366/601 |

Primary Examiner—Timothy F. Simone
Attorney, Agent, or Firm—Wegner & Bretschneider

[57] ABSTRACT

Improvements to juice extractor machines for fruit and vegetables, whereby a pestle (10) with a notch (15), a discharge conduit (16) with a great discharge capacity and a safety device with two double levers (21-26) for closure of the cover (23) of the chamber (24) cooperate with the extraction chamber (24).

Juice extractor machines for fruit and vegetables, which employ the improvements of a pestle (10) with a notch (15), a discharge conduit (16) with a great discharge capacity and a safety device with two double levers (21-26) for closure of the cover (23) of the chamber (24).

9 Claims, 2 Drawing Sheets

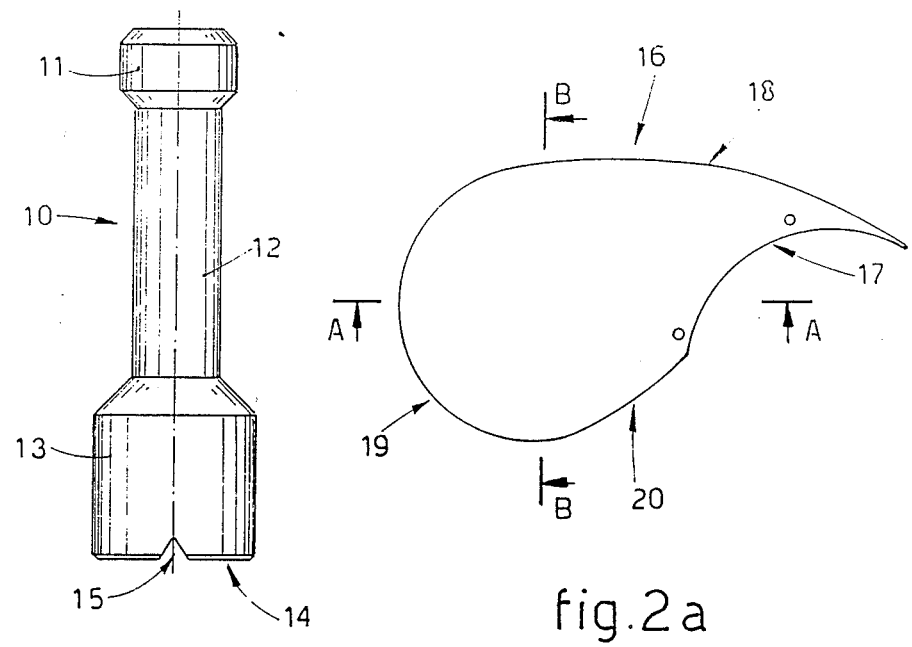
fig.1
fig.2a
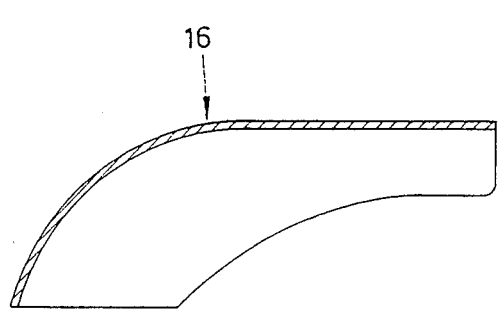
fig.2b
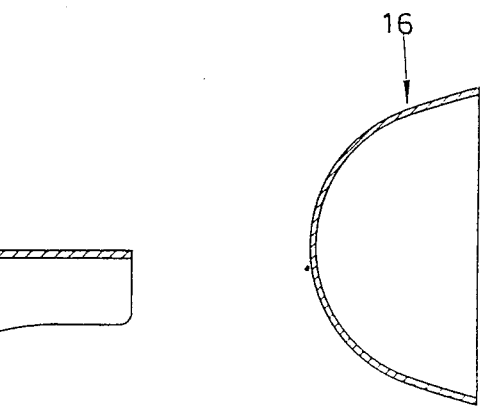
fig.2c

JUICE EXTRACTOR MACHINES FOR FRUIT AND VEGETABLES

BACKGROUND OF THE INVENTION

This invention concerns improvements to juice extractor machines for squeezing of fruit and vegetables. The invention concerns also the juice extractor machines which employ such improvements.

To be more exact, the improvements according to the invention relate to the device, called a pestle, that presses the material to be squeezed, and also to the conduit for discharge of waste material and to the safety device for closure of the cover of the juice extractor machine.

Juice extractor machines for the extraction of fruit and vegetable juices are already known in the state of the art.

Such juice extractor machines, and particularly detail those employing central introduction of the material to be squeezed, these being the machines to which we shall refer in particular hereinafter, entail many shortcomings.

One shortcoming lies in the fact that an anti-rotation device to clamp the material itself is included in the intake of the central means that introduces the material, and prevents complete squeezing of the material and full discharge of waste material. This involves production wastes and cleaning of the squeezing zone when the type of material to be processed is changed.

Moreover, the conduit for discharge of waste material entails problems of blockage and clogging with resulting stoppages of production due to increased cleaning work. Such clogging increases in an exponential manner and may jam the rotary squeezing elements violently.

Furthermore, the juice extractor machines are generally equipped with devices to close the cover of the extraction chamber. These devices, which cooperate with electrical means such as micro-switches, halt, when unclamped, the motor that drives the squeezer means, and enable the cover to be opened in safe conditions.

However, such safety may be lacking since there is no type of protection if the device is returned accidentally to the closure position without the cover being in position. In this case the motor will start up and the extraction devices will rotate.

SUMMARY OF THE INVENTION

The present improvements eliminate such shortcomings and improve the efficiency of the juice extractor machines and their reliability from the point of view of the safety of the user of the machine.

According to the invention a first improvement concerns the device called a "pestle" which presses the material to be squeezed in the central conduit of the juice extractor machine.

This pestle comprises on its flat pressure surface a notch, which is shaped substantially as a "V" upside-down and stretches across the diameter of the whole pressure surface.

This notch cooperates with the anti-rotation device that clamps the material to be squeezed on the bottom of the central conduit; the anti-rotation device consists of a metallic laminar element that stretches along the whole diametrical length of the conduit or part thereof.

In this way it is possible to carry out squeezing of the material until the juice has been completely extracted and to expel the waste fully without polluting the subsequent processing of other materials.

Improvements are also applied to the conduit for discharge of the squeezed wastes. This conduit is connected to the outlet for discharge of wastes and extents outwards and laterally to the discharge outlet.

The conformation of this conduit is suitable to increase the discharge capacity and to improve the guiding of the material in the collection containers cooperating below this conduit.

In this way there is the advantage of less clogging per unit of product processed and therefore less stoppages of the juice extractor machine for cleaning purposes.

A further improvement concerns the safety device for closure of the cover of the extraction chamber. This device comprises a closure system with two double levers, one able to oscillate on the cover while the other can oscillate on the machine body, these levers engaging each other and cooperating with positioner supports connected to the cover.

The mutual engagement and rotation of the two levers cause the closure and anchorage of the cover and the start-up of the motor of the juice extractor machine.

When the cover is open and the motor is halted, a force of resistance cooperating with one of the two levers prevents the start-up of the motor by accidental oscillations of the lever connected to that force. Conditions of absolute safety for the user are obtained in this way when the cover is open.

According to a variant the two levers are connected to and can oscillate on the body of the machine.

The invention is therefore obtained with improvements to juice extractor machines for fruit and vegetables, characterized in that a pestle with a notch, a discharge conduit with a great discharge capacity and a safety device with two double levers for closure of the cover of the chamber cooperate with the extraction chamber.

The invention is also embodied with juice extractor machines for fruit and vegetables, characterized in that they employ the improvements of a pestle with a notch, a discharge conduit with a great discharge capacity and a safety device with two double levers for closure of the cover of the chamber.

BRIEF DESCRIPTION OF THE DRAWINGS

The attached figures, which are given as a non-restrictive example, show the following:

FIG. 1 shows the improved pestle;

FIGS. 2a, 2b and 2c show a plan view and two sections of the conduit that discharges waste material;

DESCRIPTION OF THE PREFERRED EMBODIMENTS

Figure 4:
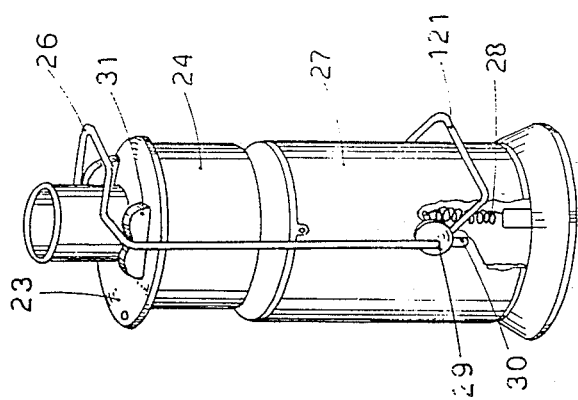
FIG. 4 shows a variant of the embodiment of FIG. 3.

FIG. 1 shows an improved pestle 10 consisting of an upper end part 11, and intermediate part 12 and a lower end part 13.

A notch 15 is machined on a squeezing surface 14 of the lower end part 13 that presses on the material to be squeezed, and cooperates with an anti-rotation clamping device in the extraction chamber.

The dimensions of the notch 15 can be varied to suit the characteristics of the clamping device.

FIG. 2a gives a plan view of a discharge conduit 16, which comprises a portion 17 connecting it to the discharge outlet of waste material, a first segment 18 substantially tangential to the extraction chamber, a second segment 19 having a substantially semi-circular section and a third segment 20 for closure of the conduit 16 in correspondence with the extraction chamber.

FIGS. 2b and 2c show sections of the conduit 16 along the lines A—A and B—B respectively.

Figure 3B:
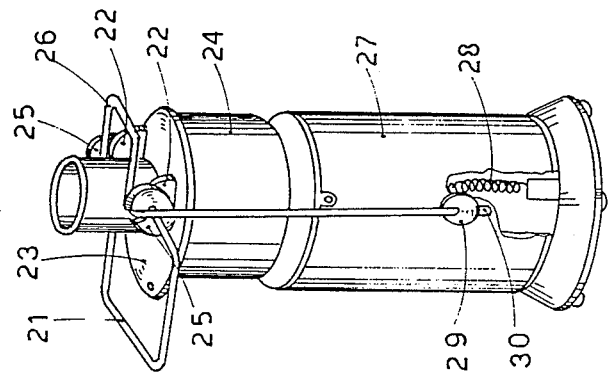
FIGS. 3a and 3b show the improved device with levers in the open and closed positions respectively.
Figure 3A:
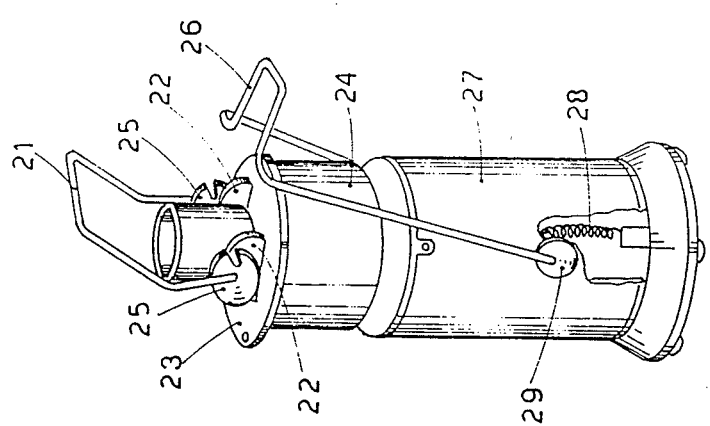

FIGS. 3a and 3b show in open and closed positions respectively a closure device with two double levers.

A first double lever 21 is connected in an oscillatory manner to two semi-circular positioner supports 22 which are rigidly connected to a cover 23 of an extraction chamber 24.

Engagement means 25 for a second double lever 26 are solidly fixed to the terminal portions of the first double lever 21 and can rotate therewith.

The second double lever 26 is connected in an oscillatory manner to a body 27 of the machine and is able to cooperate with the engagement means 25 and with the semi-circular positioner supports 22.

When engagement of the second double lever 26 has taken place, the rotation of the first double lever 21 causes the second double lever 26 to oscillate, and the second double lever 26 is lifted vertically by the resistance of the semi-circular positioner supports 22 and is then positioned on those supports 22, thus clamping the cover 23 to the extraction chamber 24.

The vertical displacement of the second double lever 26 is brought about by the sliding of its support 29 is an slot 30 machined in the body 27 of the juice extractor machine.

During its vertical displacement the second double lever 26 overcomes the resistance of a spring 28 connected to the machine body 27.

This vertical displacement actuates means, such as micro-switches or the like, which start up the motor of the juice extractor machine.

When the cover 23 is opened, the resilient force of the spring 28 returns the second double lever 26 to an inactive position, thus disconnecting the micro-switch and stopping the motor.

A mere oscillation of the second double lever 26 with the cover 23 opened, even if the oscillation reaches a position coinciding with that of closure, does not actuate the motor since such oscillation does not cause vertical displacement of the second double lever 26.

According to a variant the first double lever 121 is fixed to the machine body 27 and can oscillate thereon. The second double lever 26 is connected eccentrically to the first double lever 121 on a lower support 29, and the upper portions of the second double lever 26 cooperate with cam-shaped upper supports 31 secured to the cover 23.

I claim:

1. A juice extracting machine comprising:
   a substantially cylindrical body having two axially-oriented slots which are substantially diametrically opposed to each other;
   a substantially cylindrical extraction chamber attached to an upper portion of the body;
   a cover attached to an upper portion of the extraction chamber, said cover having an opening to receive a pestle to press material from which juice is to be extracted into the extraction chamber;
   two upper support means attached to or integral with an upper surface of the cover;
   a first substantially U-shaped lever having a closed end and two free ends, wherein each of the two free ends includes engagement means and is connected in an oscillatory manner to one of the upper support means;
   a second substantially U-shaped lever having a closed end and two free ends, wherein each of the two free ends includes lower support means positioned in one of the two slots of the body and is connected in an oscillatory manner to the body, said second lever being positioned such that the closed end is able to cooperate with said engagement means;
   and switching means within the body to allow for actuation of a motor within the body;
   wherein oscillation of the first lever when the closed end of the second lever is engaged with the engagement means allows the engagement means to displace the second lever in an axial direction with respect to the body, thus clamping the cover while simultaneously actuating the switching means.

2. The juice extracting machine of claim 1, wherein each of the engagement means is substantially circular with a notch in the perimeter thereof for engagement with the closed end of the second double lever.

3. The juice extracting machine of claim 1, wherein each of the upper supports are substantially semi-circular.

4. The juice extracting machine of claim 1, further comprising a discharge conduit attached to the extraction chamber.

5. The juice extracting machine of claim 1, further comprising spring means attached to the body and cooperating with the second lever such that the displacement of the second lever overcomes the resistance of the spring means.

6. A juice extracting machine comprising:
   a substantially cylindrical body having two axially-oriented slots which are substantially diametrically opposed to each other;
   a substantially cylindrical extraction chamber attached to an upper portion of the body;
   a cover attached to an upper portion of the extraction chamber, said cover having an opening to receive a pestle to press material from which juice is to be extracted into the extraction chamber;
   two upper support means attached to or integral with an upper surface of the cover;
   a first substantially U-shaped lever having a closed end and two free ends, wherein each of the two free ends includes lower support means positioned in one of the two slots in the body and is connected in an oscillatory manner to the body;
   a second substantially U-shaped lever having a closed end and two free ends, wherein each of the two free ends is connected in an eccentrical manner to one of the two lower support means such that the second lever can oscillate with respect to the body, and wherein the second lever is positioned such that its closed end can cooperate with the upper support means;
   aand switching means within the body to allow for actuation of a motor within the body;
   wherein movement of the second lever into a position to engage with the upper support means and oscillation of the first lever allows for displacement of the second lever in an axial direction with respect to the body, thus actuating the switching means and a clamping of the cover.

7. The juice extracting machine of claim 6, wherein the two upper support means are cam-shaped.

8. The juice extracting machine of claim 6, further comprising a discharge conduit attached to the extraction chamber.

9. The juice extracting machine of claim 6, further comprising spring means attached to the body and cooperating with the second lever such that the displacement of the second lever overcomes the resistance of the spring means.

* * * * *